United States Patent [19]

Points

[11] 4,199,167
[45] Apr. 22, 1980

[54] INSERTABLE HITCH FOR TRACTORS

[76] Inventor: Warren D. Points, 86998 Lorane Hwy., Eugene, Oreg. 97405

[21] Appl. No.: 935,886

[22] Filed: Aug. 23, 1978

[51] Int. Cl.² .............................................. B60D 1/14
[52] U.S. Cl. ................................. 280/415 A; 172/247; 172/253; 172/677; 280/515
[58] Field of Search .......... 280/415 R, 415 A, 415 B, 280/511, 515; 172/247, 248, 250, 253, 677, 679, 680, 699; 56/DIG. 14

[56] References Cited

U.S. PATENT DOCUMENTS

| 2,509,459 | 5/1950 | Stamler | 280/515 |
| 3,393,924 | 7/1968 | Silver | 280/515 |
| 3,827,724 | 8/1974 | Ackley | 280/511 |

Primary Examiner—Joseph F. Peters, Jr.
Assistant Examiner—Randall A. Schrecengost
Attorney, Agent, or Firm—James D. Givnan, Jr.

[57] ABSTRACT

A trailer hitch for mounting within the socket of a ripper assembly subsequent to ripper shank removal. A main body of the hitch defines a bite area for reception of a trailer tongue eye. A hitch pin is insertable through the bite area and is provided with a hitch ball to enable alternative towing of trailers equipped with a socket type coupler. Retention of the hitch pin against lengthwise movement is provided for by a shouldered retainer. The main body of the hitch is configured for cooperation with a socket carried locking pin.

3 Claims, 4 Drawing Figures

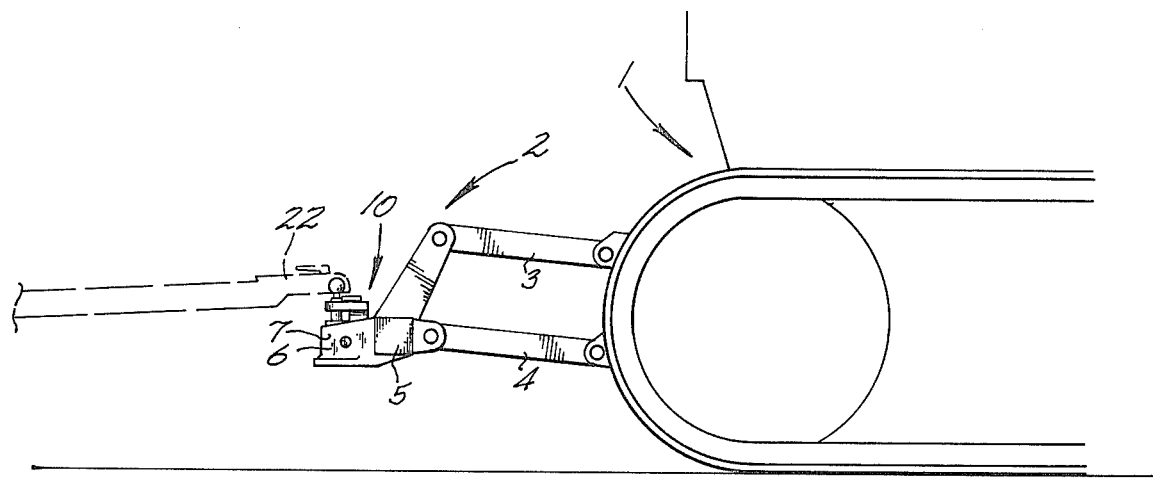
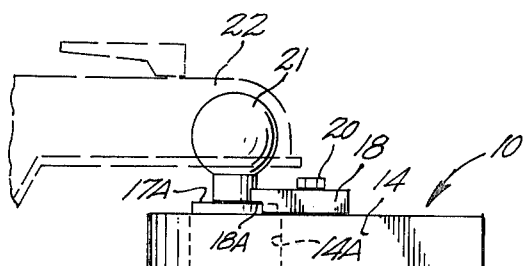
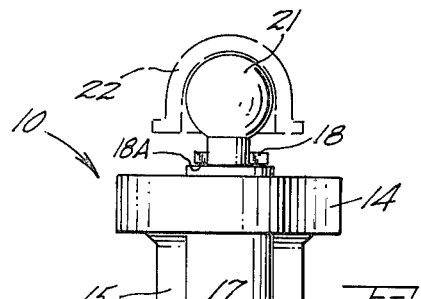
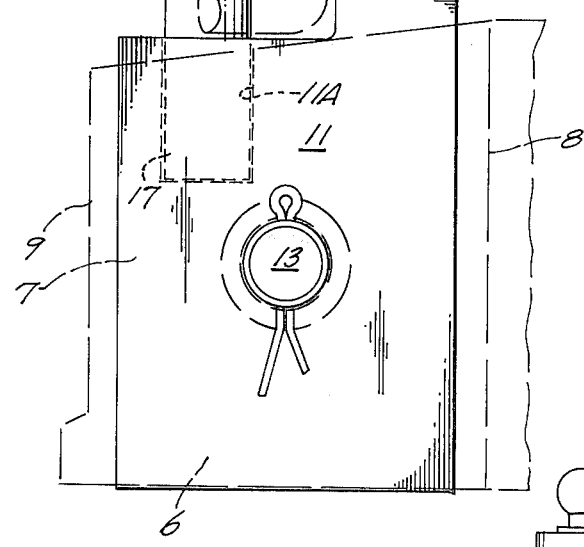
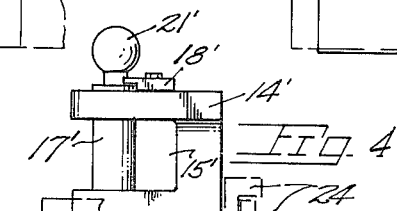

INSERTABLE HITCH FOR TRACTORS

BACKGROUND OF THE INVENTION

The present invention concerns a trailer hitch adapted for temporary mounting within a tractor ripper assembly socket which normally receives a ripper tooth or shank.

Most large track equipped tractors are adapted at their rearward ends to mount a ripper assembly. Typically, a ripper assembly includes a vertically disposed shank positionable into ground penetration and carried by a parallelogram linkage. One or more hydraulic cylinders act on a transversely disposed ripper beam to position the shank thereon into and out of ground contact. The beam is typically fitted with spaced apart sockets within which ripper shanks are removably mounted. Such securement may be by a pin extending through the socket and tooth with other locking arrangements being utilized. Typically such rippers are used in the breaking up of hardpan prior to removal.

When a tractor is equipped with a rear mounted ripper, any hitch component on the tractor frame is rendered inoperative thus necessitating the time consuming removal of the ripper assembly and reattachment after completion of trailer towing.

SUMMARY OF THE PRESENT INVENTION

The present invention is embodied within an insertable hitch for placement within a ripper shank socket of a ripper assembly.

The present hitch includes a main body of a configuration permitting inserted engagement with a ripper shank socket and additionally provides for the reception of locking means assuring hitch retention within said socket. The hitch is configured so as to enable reception of a tongue eye or alternatively, the socket of a ball receiving coupler mounted on a trailer tongue.

As various types of locking means are used for retention of ripper teeth or shanks within their sockets, the present hitch may be adapted to be compatible with various socket arrangements.

Important objectives of the present hitch insert include the provision of an insertable hitch for temporary securement within a ripper tooth socket enabling use of the tractor in a trailer towing operation without ripper assembly removal and the provision of a hitch capable of receiving either a trailer tongue mounted eye or a tongue mounted coupler socket permitting towing of a wide range of trailed vehicles; the provision of an insert type hitch insertable within the ripper tooth socket of a tractor mounted ripper assembly which may be left in place during ripping operations with only a reduction in the number of usable ripper teeth; the provision of an insert type hitch coupled to a ripper tooth socket in a convenient manner by pin or spacer insertion.

BRIEF DESCRIPTION OF THE DRAWING

In the accompanying drawing:

FIG. 1 is a fragmentary side elevational view of a tractor equipped with a ripper assembly with the present hitch in place within a ripper tooth socket thereof;

FIG. 2 is a side elevational view of the present hitch shown in place within a ripper tooth socket shown in phantom lines;

FIG. 3 is an elevational view of the hitch taken from the left side of FIG. 2; and FIG. 4 is a side elevational view of a modified form of the present hitch shown on a greatly reduced scale.

DETAILED DESCRIPTION OF THE PREFERRED EMBODIMENTS

With continuing attention to the accompanying drawing, the reference numeral 1 indicates generally a tractor which may be of the track equipped type having a ripper assembly, generally at 2, attached at its rearward end.

The ripper assembly 2 is intended to be typical of various such assemblies which commonly include a parallel linkage embodied in arms 3 and 4 which cooperate to position a ripper beam at 5 disposed transversely to the path of the tractor. Hydraulic cylinders (not shown) function to raise and lower ripper beam 5 which in a ripping operation determines the depth of ground penetration of the ripper teeth. Secured to the rearward portion of ripper beam 5 are one or more sockets as at 6 within which are normally received the elongate shanks of ripper teeth. The sockets are adapted to locably retain the ripper tooth shank as by use of a locking pin extending jointly therethrough. Accordingly the ripper tooth shank is removably mounted within the socket 6 enabling convenient ripper tooth removal for replacement, maintenance, etc. A typical ripper tooth socket includes sidewalls 7 along with opposed front and rear end walls 8 and 9 which jointly define socket opening S of rectangular horizontal section.

With attention now to the present hitch invention, the hitch is indicated generally at 10 and includes a main body 11 of rectangular, horizontal section generally corresponding to the section of the ripper tooth normally carried within the socket. Obviously, the horizontal sectional configuration of main body 11 may be varied during hitch manufacture to render the hitch useable with a specific make and model of ripper assembly. Main body 11 is transversely apertured at 12 for reception of a locking pin 13 extending therethrough and through sidewall 7 of the socket. Integral with the non-inserted upper portion of main body 11 is a plate 14 which, along with said main body upper portion defines a bite area 15 within which may be received the eye 16 of a trailer tongue. Downwardly insertable through an opening 14A in plate 14 and into an aligned opening 11A in main body 11 is a hitch pin 17. For hitch pin retention I provide a retainer 18 shouldered as at 18A to bear upon the upper end 17A of the hitch pin. A fastener 20 secures the retainer in place. Preferably, hitch pin 17 is axially drilled and tapped to enable securement of a hitch ball 21 capable of engagement with a socket type coupler 22 carried by a trailer tongue. Accordingly, the present hitch has a capability of towing trailers equipped with either a tongue eye as at 16, a ball reclining coupler as at 22 or may receive a cable tow line passing about pin 17.

With reference to FIG. 4, a somewhat modified version of the hitch is shown wherein a main body at 11' is configured to enable securement of same within a ripper tooth socket having a different tooth locking arrangement such as an inwardly extending projection at 23 normally which engages a recessed area of the ripper tooth carried therein. A spacer 24 is thereafter inserted into the socket to prevent fore and aft movement of the ripper tooth shank. Main body 11' is accordingly formed with a transversely extending opening 25 which receives socket projection 23. Spacer 24 is thereafter inserted into the socket to retain the main body against socket disengaging movement. Other like parts of the modified hitch are identified with prime reference numerals which correspond to those used to describe the first form of the invention.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. In combination,
   a ripper beam adjustably supported rearwardly and transversely of a tractor, said beam having at least one socket thereon normally for the reception of a ripper tooth,
   a trailer hitch in inserted engagement with said socket, said hitch having a non-socket inserted portion defining a bite area for the reception of a trailer tongue mounted eye, a hitch pin occupying a portion of said bite area for reception of a bite occupying trailer tongue eye, said pin having a hitch ball at one of its ends for alternative reception of a tongue mounted ball receiving coupler.

2. The combination claimed in claim 1 additionally including a locking pin extending transversely through said hitch and said socket.

3. The combination claimed in claim 2 wherein said hitch defines a transversely extending opening, said socket having a projection engageable with the hitch defined opening to prevent unintentional hitch disengagement from the socket.

* * * * *